(12) United States Patent
Parkes et al.

(10) Patent No.: US 8,596,409 B2
(45) Date of Patent: Dec. 3, 2013

(54) SYSTEMS AND METHODS FOR PRODUCING DIRECTED SEISMIC WAVES IN WATER

(75) Inventors: Gregory Ernest Parkes, Corsham (GB); Stian Hegna, Høvik (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 13/271,769

(22) Filed: Oct. 12, 2011

(65) Prior Publication Data
US 2013/0092469 A1 Apr. 18, 2013

(51) Int. Cl.
*G01V 1/00* (2006.01)

(52) U.S. Cl.
USPC .......................................................... 181/120

(58) Field of Classification Search
USPC .......................................................... 181/120
See application file for complete search history.

(56) References Cited

U.S. PATENT DOCUMENTS

| | | | |
|---|---|---|---|
| 2,586,706 A | 2/1952 | Parr, Jr. | |
| 3,480,101 A * | 11/1969 | Chalmers et al. | 181/118 |
| 3,728,671 A | 4/1973 | Poston, Jr. | |
| 3,730,289 A | 5/1973 | Barnhard, IV | |
| 4,185,714 A * | 1/1980 | Pascouet et al. | 181/120 |
| 4,189,026 A * | 2/1980 | Elliot et al. | 181/118 |
| 4,193,472 A * | 3/1980 | Kirby | 181/118 |
| 4,246,979 A * | 1/1981 | Thomson et al. | 181/120 |
| 4,594,697 A * | 6/1986 | Pascouet | 367/146 |
| 4,618,024 A | 10/1986 | Domenico | |
| 4,632,213 A | 12/1986 | Domenico | |
| 4,734,894 A | 3/1988 | Cannelli et al. | |
| 4,811,815 A * | 3/1989 | Meier et al. | 181/120 |
| 4,970,704 A * | 11/1990 | Kelly | 367/142 |
| 5,572,486 A * | 11/1996 | Landro et al. | 367/144 |
| 5,646,910 A * | 7/1997 | Bouyoucos | 367/144 |
| 7,228,934 B2 * | 6/2007 | Guion | 181/113 |
| 7,377,357 B2 * | 5/2008 | Duren et al. | 181/121 |
| 8,136,625 B2 * | 3/2012 | Hopperstad et al. | 181/120 |
| 2004/0035349 A1 * | 2/2004 | Barker | 114/243 |
| 2010/0252356 A1 | 10/2010 | Hopperstad et al. | |

FOREIGN PATENT DOCUMENTS

| | | |
|---|---|---|
| CN | 201569749 | 1/2010 |
| EP | 2519837 | 7/2011 |
| GB | 1161525 | 8/1969 |
| GB | 1376513 | 12/1974 |
| GB | 2136568 | 9/1984 |
| GB | 2481840 | 1/2012 |

OTHER PUBLICATIONS

United Kingdom Search Report, Mailing Date: Feb. 8, 2013.

* cited by examiner

*Primary Examiner* — Forrest M Phillips

(57) ABSTRACT

A disclosed seismic source assembly includes a body having a cavity and a seismic source positioned in the cavity. The cavity is in fluid communication with the water via an aperture oriented in a first direction. One or more surfaces of the body define a water contact significantly larger than an area of the aperture and on a side opposite the first direction. A described method includes forming a source assembly by: providing a cavity having an aperture for transmitting seismic waves; rigidly attaching a base to a side of the cavity opposite the aperture, where a transverse area of the base is significantly larger than an area of the aperture; and positioning a seismic source in the cavity. The source assembly is submerged in the water and triggered.

21 Claims, 3 Drawing Sheets

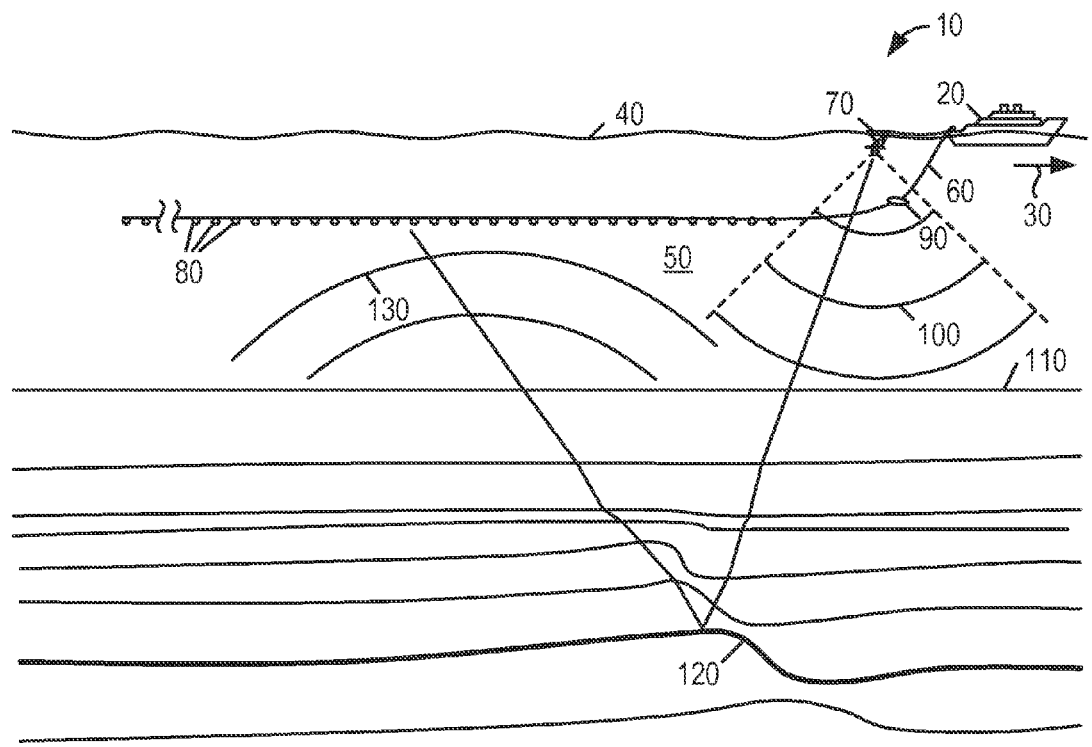
FIG. 1
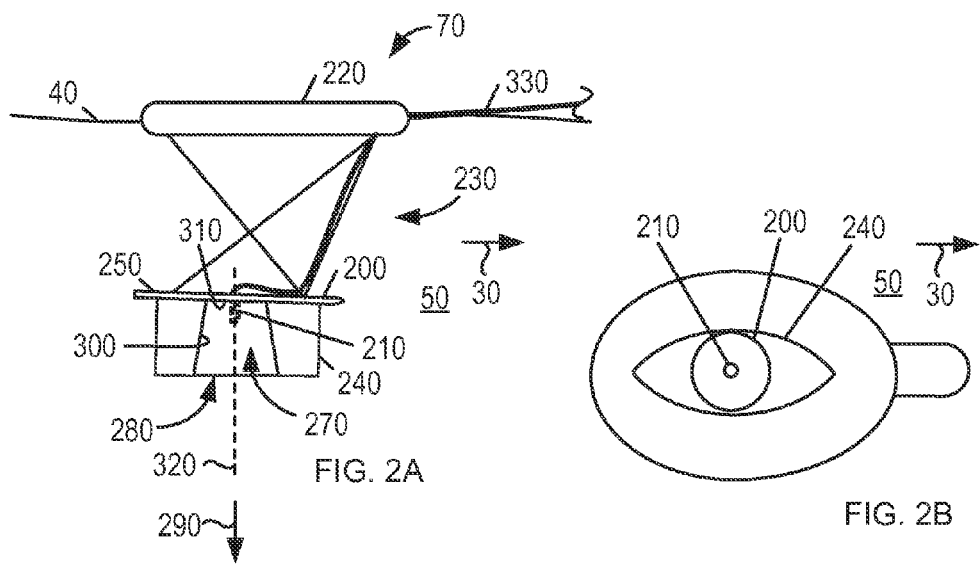
FIG. 2A
FIG. 2B

SYSTEMS AND METHODS FOR PRODUCING DIRECTED SEISMIC WAVES IN WATER

BACKGROUND

In the field of geophysical prospecting, the knowledge of the subsurface structure of the earth is useful for finding and extracting valuable mineral resources such as oil and natural gas. A well-known tool of geophysical prospecting is a "seismic survey". In a seismic survey, acoustic waves produced by one or more sources are transmitted into the earth as an acoustic signal. When the acoustic signal encounters an interface between two subsurface strata having different acoustic impedances, a portion of the acoustic signal is reflected back toward the earth's surface. Sensors detect these reflected portions of the acoustic signal, and outputs of these sensors are recorded as data. Seismic data processing techniques are then applied to the collected data to estimate the subsurface structure.

Seismic surveys can be performed on land or at sea (or other bodies of water). In a typical marine seismic survey, a parallel arrangement of multiple streamer cables or "streamers" are towed behind a vessel, each streamer including multiple seismic sensors positioned at spaced intervals along its length. One or more seismic sources may also be towed behind the vessel and periodically triggered to provide multiple measurements throughout the region of interest.

Because the acoustic impedance of air is much lower than that of water, marine seismic sources are typically submerged to increase the efficiency with which acoustic energy is coupled to the seafloor. Conventional marine seismic sources radiate acoustic energy in directions, i.e., not only within the beam that is useful for detecting reflections from the subsurface, but also in all other directions including the horizontal direction within the water layer and upward towards the sea-surface. Because of this, a significant part of the total amount of energy is emitted in directions that are not useful tier detecting reflections from layers in the subsurface. In addition, energy that is propagating in the upward direction towards the sea surface from conventional seismic sources is reflected down again. The reflection makes it appear as if each source firing is shortly followed by the firing of a "ghost" source, causing the downward-propagating waves to interfere constructively and destructively with each other, thereby degrading measurements.

BRIEF DESCRIPTION OF THE DRAWINGS

A better understanding of the various disclosed embodiments can be obtained when the following description is considered in conjunction with the attached drawings, in which:

FIG. 1 shows an illustrative marine seismic survey system;

FIG. 2A is a side elevation view of an illustrative seismic source assembly;

FIG. 2B is a bottom plan view of the illustrative seismic source assembly;

Figure 3:
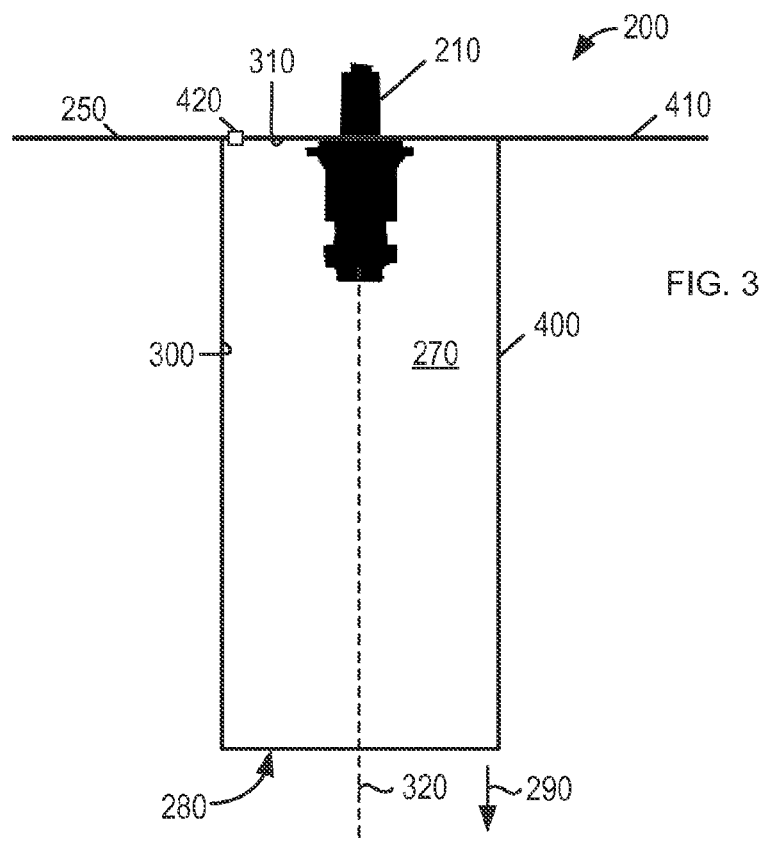
FIG. 3 is a side section view of an alternative seismic source assembly.

While the invention is susceptible to various alternative forms, equivalents, and modifications, specific embodiments thereof are shown by way of example in the drawings and will herein be described in detail. It should be understood, however, that the drawings and detailed description thereto do not limit the disclosure, but on the contrary, they provide the foundation for alternative forms, equivalents, and modifications falling within the scope of the appended claims.

DETAILED DESCRIPTION

The problems outlined above are at least in part addressed by the disclosed systems and methods for producing directed seismic waves in water. In at least some embodiments, a disclosed marine seismic source assembly includes a body having a cavity and a seismic source positioned in the cavity. The cavity is in fluid communication with the water via a downwardly-oriented aperture. The body further includes an upwardly-oriented surface having a water contact area significantly larger than the aperture. As it is towed in a body of water, the submerged assembly may be kept at a constant or controllable depth by any of a variety of mechanisms. By placing the source in a submerged body having downward-facing aperture and a significantly larger upper surface area, seismic energy produced from the source is preferentially directed downward by forcing water motion in a restricted cone or beam, thereby increasing the signal levels emitted by the source in the preferred directions or beam. Also, less energy will propagate towards the sea surface hence reducing the source ghost effect. The source may be an air gun, in which case the body preferably includes a mechanism for releasing trapped air from the cavity between source firings.

Turning now to the figures, FIG. 1 shows an illustrative marine seismic survey system 10 including a survey vessel or ship 20 moving in a forward direction 30 across a surface 40 of a body of water 50. The ship 20 is towing an array of streamers 60 and, in this case, a seismic source assembly 70 through the body of water 50. In other embodiments, the seismic source assembly 70 may be towed by a different vessel, and in any case the system may include multiple such source assemblies. Each streamer 60 includes a set of spaced-apart seismic sensors 80 to detect seismic waves propagating through the body of water 50. Each source assembly 70 and streamer 60 typically, but not necessarily, includes one or more controllable positioning devices 90 to maintain a desired operating depth and position relative to the other system components.

As ship 20 tows the seismic source assembly 70 and streamers 60 along a path over a subsurface region of interest, the seismic source assembly 70 generates seismic waves 100 that travel through the body of water 50 and into a subsurface below a bottom surface 110. The seismic waves 100 that can contribute to the final seismic image are in a limited angular beam, because of simple geometrical considerations. Within the subsurface, the seismic waves 100 reflect from acoustic impedance contrasts such as those caused by a boundary 120 between subsurface structures. The reflected seismic waves, labeled '130' in FIG. 1, travel back through the subsurface, re-enter the body of water 50, and are detected by the seismic sensors 80. The seismic sensors 80 produce output signals indicative of the reflected seismic waves, and the output signals are communicated to a recording system on the ship 20, which stores the output signals on an information storage medium. The recording system may further include a control unit to coordinate the operations of the positioning device 90, seismic source assembly 70, and the seismic sensors 80.

FIG. 2A is a side elevation view of an illustrative embodiment of the seismic source assembly 70, and FIG. 2B shows a bottom plan view. In the illustrated embodiment, the seismic source assembly 70 includes a body 200 defining a cavity 270 with a downwardly-oriented aperture 280. The body 200 further includes an upwardly-facing surface 250 that contacts the water across a transverse cross-section substantially larger than the area of the aperture 280. The illustrative embodiment includes a float 220 connected to the body 200 by a suspension system 230. The suspension system 230 maintains the body 200 at a desired depth and in the desired orientation as the assembly is towed behind ship 20. A cowling 240 may be provided to streamline the body 200 for laminar (i.e., non-turbulent) fluid flow around the body during the towing process. A tow cable 330 includes a high pressure air hose and/or other sources of energy for triggering the seismic source 210.

In the illustrative embodiment, the body 200 has a top surface 250 fixed to a cavity 270 with a downwardly-oriented aperture 280 that establishes fluid communication between the interior of the cavity and the body of water 50. Water from the body of water 50 is allowed to enter the cavity 270 via the aperture 280 when the assembly is submerged. The seismic source 210 generates seismic waves inside the cavity, and the cavity contains and directs the seismic wave energy through the downwardly-oriented aperture 280. The body significantly reduces the energy propagating in directions that are not desired for detecting reflections from the subsurface, which in turn enhances the amount of energy propagating in the beam and thereby enhances the imaging of the subsurface. In addition, the body minimizes the energy reflected from the water's surface 40 and reduces the ghost effect. (Though the illustrated embodiment is configured to direct seismic energy downwardly, other embodiments may be configured to direct the seismic energy in other desired directions by simply re-orienting the body so that the aperture faces the desired direction.)

The cavity 270 is defined by one or more inner surface(s) of the body 200. The inner surface(s) that define the cavity 270 are preferably rigid, with a high acoustic impedance contrast to the water such that they reflect seismic waves produced by the seismic source 210. The surface(s) that define the cavity 270 may also be axisymmetric—symmetric about axis 320.

In the illustrative embodiment of FIG. 2, the cavity 270 is defined by a side wall 300 and an upper wall 310. The side wall 300 is sloped and the upper wall 310 is flat such that the cavity 270 is shaped like a truncated cone. The side wall 300 and the upper wall 310 are rigid such that they reflect seismic waves produced by the seismic source 210. The side wall 300 is symmetric about a central axis 320, as is the cavity 270. In other embodiments, the cavity 270 may be cylindrical (see, e.g., FIG. 3) or bell-shaped, e.g., with a hemispherical or parabolic upper wall 310. The aperture 280 may also be symmetric about the central axis 320, and in the illustrated embodiment the aperture is circular.

For axisymmetric cavities, placement of the seismic source 210 on the central axis 320 may be preferred to produce a downgoing wave with a symmetric radiation pattern. The distance between source 210 (e.g., the outlet port of an airgun) and the upper wall 310 may be kept equal to or less than the distance from the source to any sidewall 300 so as to maximize the effectiveness with which the source generates directed fluid outflow through the aperture. Contemplated seismic sources include air guns, water guns, and explosives. The high pressure air, high pressure water, or combustible material may be supplied to the source via a hose from the tow vessel. The hose, along with any desired electrical power or control/data lines, may be attached to the tow line 330.

When the seismic source 210 is triggered, the seismic source 210 creates a shock wave in cavity 270, e.g., by rapid releases of a quantity of high pressure air. As the quantity of high pressure air rapidly expands in the cavity 270, it drives an outflow of fluid. The upper and side walls of cavity 270 contain any flow in those directions, thereby redirecting and amplifying the fluid outflow through the aperture 280 and into the body of water 50. As a result, the body 200 directs the seismic waves produced by the seismic source 210 in a downward direction 290, restricted to a cone or beam having an increased signal level. The seismic wave energy that would otherwise have propagated in directions outside the desired beam is significantly reduced.

A potential problem arises in that when the seismic source 210 is triggered, the action of the water on the inner watts of the cavity produces an upward force tending to move the body 200 in the upward direction. This force destabilizes the seismic source assembly 70 and generates an acceleration that would tend to generate an upward-traveling seismic wave. This acceleration can be reduced by either or both of two techniques. First, the mass of the body 200 can be increased—for every doubling of the body mass, the acceleration will be halved in accordance with Newton's second law. In some embodiments, the body mass is at least double the mass of the water displaced by the firing of the source, and larger ratios (e.g., 3, 4, 5, or more) may be considered desirable. There is a limit on the body mass, however, as the assembly can become too unwieldy to deploy and maneuver if the mass grows too large, so other mechanisms for reducing the upward acceleration are desirable.

The second technique for reducing the acceleration is to increase the assembly's resistance to vertical motion, e.g., by increasing the transverse area of top surface 250, thereby increasing the amount of water that would be shifted by vertical motion of the body 200. It is believed that the transverse area of the top surface 250 should be greater than about twice the area of the aperture, and larger ratios may be expected to further reduce any upward motion of the body 200. Ratios of 3, 5, or 10 (or even more) times the aperture area may be considered suitable, depending on the mass of the body 200. Shapes that maximize resistance to vertical motion may be considered desirable, e.g., a flat horizontal surface. In some contemplated embodiments, the top surface 250 may be pitched forward so that as the assembly is towed, the water exerts an additional downward force to resist upward movement of the body 200.

For seismic sources 210 other than a water gun, the firing produces an air bubble of a predictable volume in the cavity 270. Generally the cavity volume is expected to be greater than the air bubble volume for better directivity. The radius of the cavity around the source position may be expected to be approximately equal to the bubble radius. A valve or other mechanism may be provided to release the trapped air after each firing of the source.

FIG. 3 is a side section view of an alternative embodiment body 200 including a hollow cylindrical portion or tube 400 with a rigidly attached end plate 410 that forms top surface 250. An air gun 210 is mounted through plate 410 and positioned on the central axis 320 of cavity 270. The outlet ports of gun 210 are substantially equidistant from end plate 410 and the walls of tube 400 with a distance approximately equal to the expected bubble radius. In the illustrated embodiment, the area of the flat top surface 250 of the plate 410 is greater than the area of the downward-oriented aperture 280. When the seismic source 210 is triggered, it rapidly releases a quantity of high pressure air to the cavity 270, producing seismic waves that exit via aperture 280 to propagate generally in a downward direction 290. The resulting upward force exerted on the body 200 by the water escaping the cavity 270 via the aperture 280 is substantially countered by the resistance to upward motion created by the flat top surface 250 of the plate 410.

When the seismic source 210 is triggered and the air stops expanding, an air bubble of a given volume exists in the cavity 270. This trapped air hampers subsequent operation of the seismic source assembly 70. In the embodiment of FIG. 3, the seismic source assembly 70 includes a valve 420 extending through the plate 410 and into the cavity 270. When activated or opened, the valve 420 allows air trapped in the cavity 270 to escape from the cavity 270. In some alternative embodiments, a small always-open perforation is provided to enable the slow escape of any trapped air. (A similar valve or opening may be provided in the embodiment of FIG. 2 to prevent air from being trapped in the cavity.)

Figure 4:
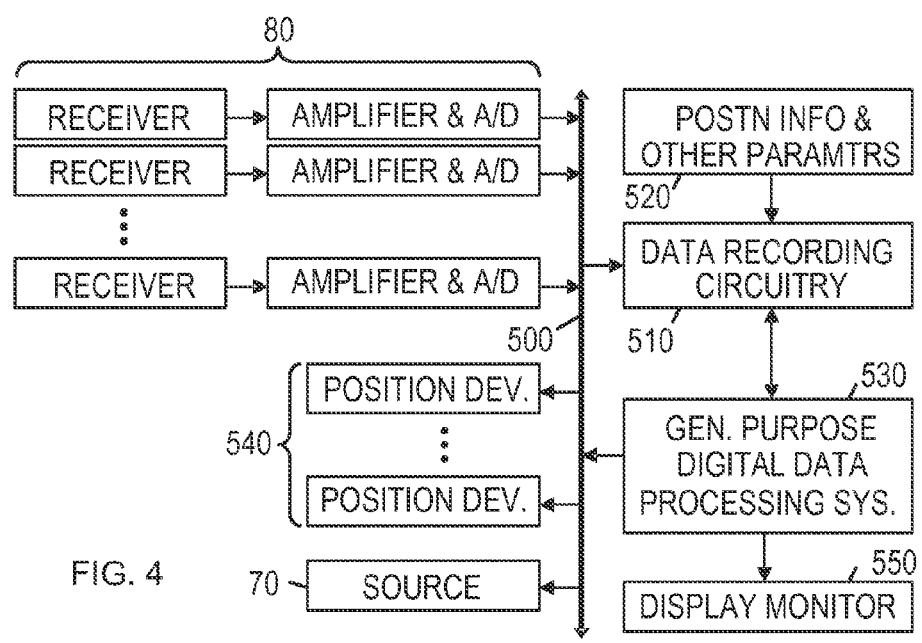
FIG. 4 is a function block diagram of an illustrative seismic survey system.

FIG. 4 is an illustrative function block diagram for one embodiment of seismic survey system 10. Referring to FIGS. 1 and 4, one or more receiver(s) receive the output signals produced by the seismic sensors 80. The receiver(s) may have their signals amplified and digitized as indicated in FIG. 4. A streamer bus 500 carries the digitized data to recording circuitry 510, which stores the seismic data on information storage media along with survey information such as time and position information and other potentially relevant parameters from other sensors 520. The acquired information may be monitored by an appropriately programmed general purpose data processing system 530, which further sends commands to alter the settings for positioning devices 540 (including the positioning devices 90 for the streamers 60). The data processing system 530 or another control system may issue commands to trigger the seismic source assembly 70. The data processing system 530 may display information regarding the survey acquisition parameters and data being acquired, including paths of the seismic source assembly 70, the streamers 60, and/or the ship 20 on a display monitor 550.

Figure 5:
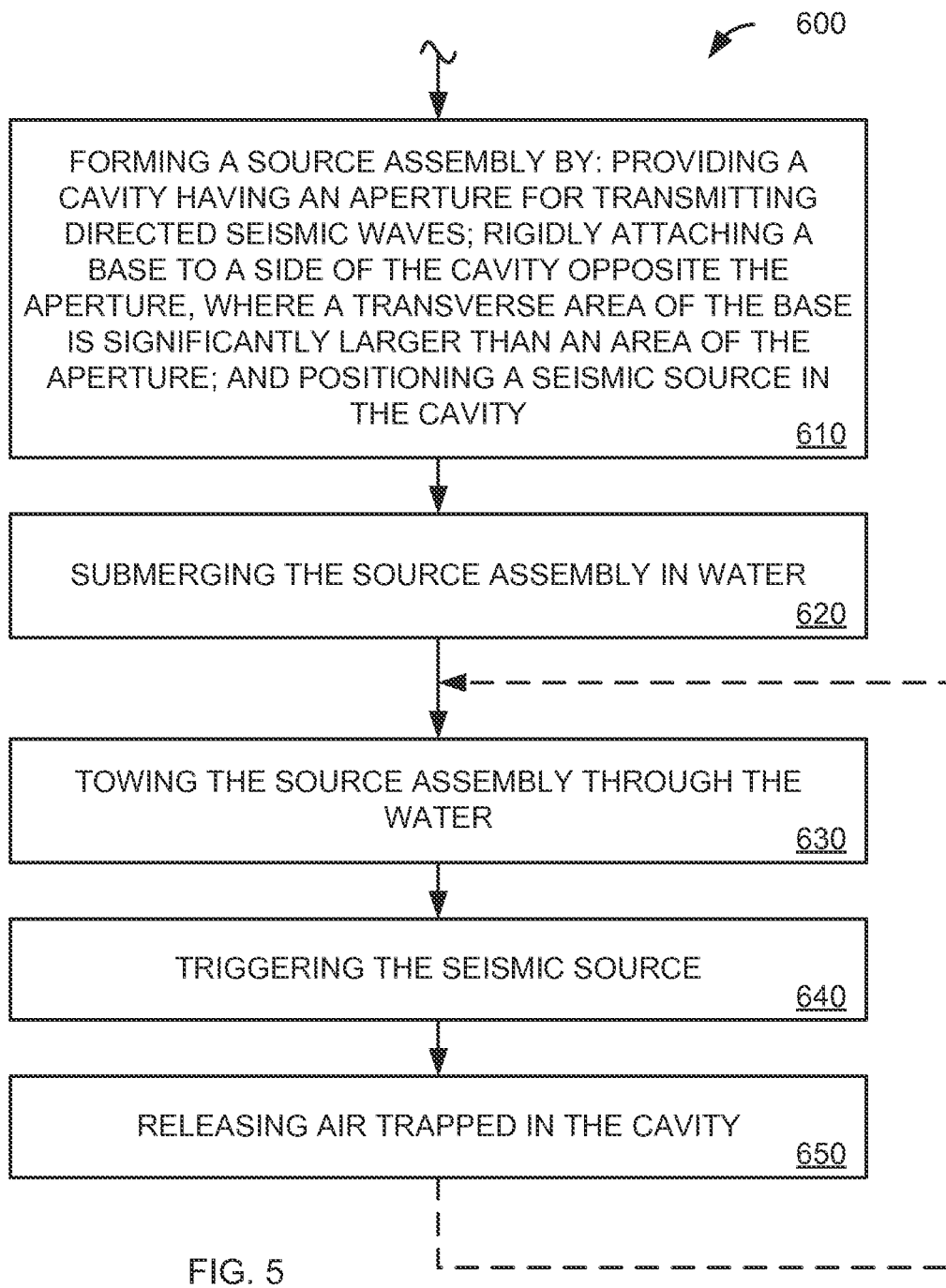
FIG. 5 is a flowchart of a method for producing directed seismic waves in water.

FIG. 5 is a flowchart of an illustrative method 600 for producing directed seismic waves in water. During a first block 610 of the method 600, a source assembly (e.g., the seismic source assembly 70) is obtained with a cavity having an aperture for transmitting directed seismic waves; and a rigidly attached base (e.g., the plate 410) on a side of the cavity opposite the aperture. A seismic source (e.g., source 210) is positioned in the cavity. The transverse area of the base is preferably significantly larger than an area of the aperture. The cavity may be shaped as an axisymmetric reflector or a waveguide. The seismic source may be configured to release a quantity of high pressure air that produces an air bubble of a given radius. The seismic source may be positioned in the cavity such that a distance from each wall defining the cavity (e.g., the side wall 300 and an upper wall 310) is approximately equal to the given radius.

The source assembly is submerged in water (e.g., the body of water 50) during a block 620. During a block 630, the source assembly is towed through the water. The seismic source is triggered during a block 640. During a block 650, air trapped in the cavity is released. In some embodiments, the blocks 630, 640, and 650 are repeated.

Numerous variations and modifications will become apparent to those skilled in the art once the above disclosure is fully appreciated. It is intended that the following claims be interpreted to embrace all such variations and modifications.

What is claimed is:

1. A seismic source assembly for producing directed seismic waves in water, the seismic source assembly comprising:
a body having:
a cavity in fluid communication with the water via an aperture oriented in a first direction, the aperture having an area; and
one or more surfaces in fixed relation to the cavity, the one or more surfaces defining a water contact on a side opposite the first direction, the water contact having a total transverse area at least 3 times the area of the aperture; and
a seismic source positioned in the cavity.

2. The assembly of claim 1, wherein the aperture is axisymmetric with respect to an axis.

3. The assembly of claim 2, wherein the one or more surfaces are axisymmetric with respect to the axis.

4. The assembly of claim 3, wherein the cavity is axisymmetric with respect to the axis.

5. The assembly of claim 4, wherein the cavity is cylindrical or bell-shaped.

6. The assembly of claim 1, wherein the cavity is a circular or elliptical parabolic reflector.

7. The assembly of claim 1, wherein the cavity is defined by rigid walls.

8. The assembly of claim 1, wherein the one or more surfaces comprise a substantially flat surface parallel to the aperture.

9. The assembly of claim 2, further comprising a cowling that streamlines the body for motion through the water in a direction transverse to the axis.

10. The assembly of claim 1, further comprising a valve configured to release trapped air from the cavity.

11. The assembly of claim 1, wherein the seismic source is an air gun configured to produce an air bubble of a given volume, the volume being less than a volume of the cavity.

12. The assembly of claim 1, further comprising:
a float adapted to support the body below a surface of the water and for towing by a vessel; and
a suspension system disposed between the float and the body and configured to maintain the body in a desired orientation while the float is towed by the vessel.

13. The assembly of claim 1, wherein the body has a mass at least double that of water displaced by a firing of the seismic source.

14. The assembly of claim 13, wherein the body has a mass at least 3 times that of water displaced by a firing of the seismic source, and wherein the total transverse area of the water contact is at least 5 times the area of the aperture.

15. The assembly of claim 1, wherein the total transverse area of the water contact is at least 10 times the area of the aperture.

16. The assembly of claim 1, wherein the one or more surfaces exert a downward force on the body when the assembly is towed through the water.

17. A method employing a source assembly comprising a seismic source positioned in a cavity, the cavity having an aperture for transmitting directed seismic waves and a rigidly-attached base opposite the aperture, the rigidly-attached base having a transverse area at least 3 times the area of the aperture, the method comprising:
submerging the source assembly in the water; and
triggering the seismic source.

18. The method of claim 17, further comprising:
towing the source assembly through the water; and
repeating the triggering of the seismic source as the source assembly is towed.

19. The method of claim 17, further comprising:
releasing trapped air from the cavity after each triggering.

20. The method of claim 17, wherein the cavity is shaped as an axisymmetric reflector or waveguide.

21. The method of claim 20, wherein triggering the seismic source includes causing the seismic source to produce an air bubble of a given radius, the radius being approximately equal to a distance between the source and each wall that defines the cavity.

* * * * *